(12) United States Patent
Bergqvist et al.

(10) Patent No.: US 11,191,008 B2
(45) Date of Patent: Nov. 30, 2021

(54) METHODS, NETWORK NODE AND WIRELESS DEVICE FOR COMMUNICATING AND OBTAINING SYSTEM INFORMATION IN A FEMBMS SYSTEM

(71) Applicant: Telefonaktiebolaget LM Ericsson (publ), Stockholm (SE)

(72) Inventors: Jens Bergqvist, Linköping (SE); Johan Bergman, Stockholm (SE); Helka-Liina Määttänen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 433 days.

(21) Appl. No.: 16/338,763

(22) PCT Filed: Oct. 3, 2017

(86) PCT No.: PCT/SE2017/050966
§ 371 (c)(1),
(2) Date: Apr. 2, 2019

(87) PCT Pub. No.: WO2018/067057
PCT Pub. Date: Apr. 12, 2018

(65) Prior Publication Data
US 2021/0289426 A1    Sep. 16, 2021

Related U.S. Application Data

(60) Provisional application No. 62/404,299, filed on Oct. 5, 2016.

(51) Int. Cl.
*H04W 48/12*    (2009.01)
(52) U.S. Cl.
CPC ................... *H04W 48/12* (2013.01)

(58) Field of Classification Search
CPC ..... H04W 48/10; H04W 48/12; H04W 48/14; H04W 72/042
See application file for complete search history.

(56) References Cited

U.S. PATENT DOCUMENTS

2011/0280477 A1* 11/2011 Al-Omari ............ G06K 9/342
382/165
2012/0039256 A1    2/2012 Kwon et al.
(Continued)

FOREIGN PATENT DOCUMENTS

CN    105122917 A    12/2015
WO    2013 064086 A1    5/2013

OTHER PUBLICATIONS

Chinese Office Action issued for Application No. 201780071324.6—dated Oct. 12, 2020.
(Continued)

*Primary Examiner* — Kevin Kim
(74) *Attorney, Agent, or Firm* — Baker Botts, LLP

(57) ABSTRACT

A network node (200), a wireless device (202) and methods therein, for communicating or obtaining system information. The network node (200) transmits (2:1) a System Information Block Type1, SIB1, message that includes at least one other SIB than SIB1 as an extension. The wireless device (202) reads (2:2) the at least one other SIB in the SIB1 if the wireless device (202) is capable of reading the extension in the SIB1 message. The network node (200) may further transmit (2:1) the at least one other SIB in a subsequent separate System Information message. The wireless device (202) is then able to read (2:4) the at least one other SIB in the subsequently received System Information message if the wireless device (202) is not capable of reading the extension in the SIB1 message. Thereby, if the wireless device is capable of reading the extension in the SIB1 message it will acquire the system information earlier than (Continued)

if the other SIBs are only transmitted in less frequent System Information messages. If the wireless device is not capable of reading the extension in the SIB1 message, it can still acquire the other SIB(s) from the subsequent System Information message.

26 Claims, 4 Drawing Sheets

(56) References Cited

U.S. PATENT DOCUMENTS

2018/0020366 A1* 1/2018 Martin .................. H04B 17/318
2019/0174458 A1* 6/2019 Liu .......................... H04W 8/18

OTHER PUBLICATIONS

3GPP TSG-RAN WG2 #95bis; Kaohsiung, Taiwan; Source: Ericsson; Title: FeMBMS System Information (Tdoc R2-166936)—Oct. 10-14, 2016.
3GPP TSG-RAN2 Meeting #95bis; Kaohsiung, Taiwan; Source: Qualcomm Incorporated; Title: System Information for FeMBMS (R2-167139)—Oct. 10-14, 2016.
PCT International Search Report for International application No. PCT/SE2017/050966—dated Dec. 13, 2017.
PCT Written Opinion of the International Searching Authority for International application No. PCT/SE2017/050966—dated Dec. 13, 2017.

* cited by examiner

METHODS, NETWORK NODE AND WIRELESS DEVICE FOR COMMUNICATING AND OBTAINING SYSTEM INFORMATION IN A FEMBMS SYSTEM

PRIORITY

This nonprovisional application is a U.S. National Stage Filing under 35 U.S.C. § 371 of International Patent Application Serial No. PCT/SE2017/050966 tiled Oct. 3, 2017 and entitled "METHODS, NETWORK NODE AND WIRELESS DEVICE FOR COMMUNICATING AND OBTAINING SYSTEM INFORMATION IN A FEMBMS SYSTEM" which claims priority to U.S. Provisional Patent Application No. 62/404,299 filed Oct. 5, 2016, both of which are hereby incorporated by reference in their entirety.

TECHNICAL FIELD

The present disclosure relates generally to a network node, a wireless device and methods therein, for communicating and obtaining system information in a wireless network.

BACKGROUND

In this disclosure, the term "wireless device" is used to represent any communication entity capable of radio communication with a radio network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "network node", is used herein to represent any node of a radio network that is operative to communicate with a wireless device over a radio interface and to transmit system information. The network node in this disclosure may refer to a base station, radio node, Node B, base transceiver station, access point, etc., which communicates radio signals with the wireless device. The term "Node B" is used herein to represent such a base station or radio node.

A Single-Frequency Network, SFN, is a broadcast network where several transmitters simultaneously send the same signal over the same frequency channel. The aim of SFNs is efficient utilization of the radio spectrum, allowing broadcast of more multimedia content such as TV programs, in comparison to traditional Multi-Frequency Network, MFN, transmission. An SFN may also increase the coverage area and decrease the outage probability in comparison to an MFN, since the total received signal strength may increase at positions between the transmitters.

Multimedia Broadcast Multicast Services, MBMS, is a point-to-multipoint interface specification for existing and upcoming cellular networks as defined by the third Generation Partnership Project, 3GPP. MBMS is designed to provide efficient delivery of broadcast and multicast services, both within a cell as well as within a core network. For broadcast transmission across multiple cells, MBMS defines transmission via SFN configurations. The specification is referred to as evolved MBMS, or eMBMS for short when transmissions are delivered through a Long Term Evolution, LTE, network. eMBMS is also known as LTE Broadcast.

Further, Multicast-Broadcast Single-Frequency Network, MBSFN, is a communication channel defined in LTE. The transmission mode used in MBSFN is intended as a further improvement of the efficiency of eMBMS, to deliver services such as mobile TV using the LTE infrastructure. This enables network operators to offer mobile TV without the need for additional expensive licensed spectrum and without requiring new infrastructure and end-user devices.

In the following description, the terms "RAN1" and "RAN2" as defined by 3GPP for a Radio Access Network (RAN) basically refer to a physical layer and radio interface protocols, respectively, of the RAN.

In LTE-based networks, system information is broadcasted over the air interface and includes the Master Information Block, MIB, and a number of System Information Blocks, or SIBs for short. The MIB is broadcast on the Physical Broadcast Channel PBCH, while SIBs are sent on the Physical Downlink Shared Channel PDSCH through Radio Resource Control, RRC, messages. SIB1 is carried by a "System InformationBlockType 1" message. SIB2 and other SIBs are carried by a "System Information (SI)" message. An SI message can contain one or several SIBs.

Further, the term "SFN delay spread" refers to the difference between the time of arrival of the earliest significant multipath component of an SFN broadcast, typically the line-of-sight component arriving without reflection, and the time of arrival of the latest multipath components of the broadcast.

A new Work Item, WI, to further enhance MBMS (Multimedia Broadcast Multicast Service) operation was approved in RAN#71 in RP-160675 and further revised in RAN#72 in RP-161297 and reads as follows:

The Objective of the Work Item is to Evaluate and Specify the Following EMBMS Enhancements for LTE:
  a. Specify means of using a longer Cyclic Prefix, CP (e.g. greater than 33.33 µs) for use in a mixed unicast/eMBMS carrier for large SFN delay spread environment (e.g. 15 km or larger inter-site distance), which guarantees coexistence of the legacy and new prefixes on the same carrier, while achieving a spectral efficiency of at least 2 bps/Hz. This objective includes evaluation. (RAN1, RAN4)
  b. Specify means of using subframes 0, 4, 5, 9 (FS1) and 0, 1, 5, 6 (FS2) for MBSFN. (RAN2, RAN1) The non-MBSFN subframes for unicast can only be used as Scell
  c. Specify means of configuring MBSFN subframes without a unicast control region and cell-specific reference signals. (RAN1, RAN2)
Note: Both connected and idle mode FeMBMS operation are included.
Study the Following:
  d. Support for standalone carrier with all DL subframes dedicated to MBSFN transmission and self-contained eMBMS signaling including information of SIB13, SIB15, SIB16. (RAN2)
  e. Support for multi-carrier eMBMS/unicast operation involving reception from one or more eMBMS cells that may be non-collocated and asynchronous with one or more cells that are simultaneously used for unicast. (RAN4, RAN2)
  f. Solutions where a UE can receive the TV transport service without being authenticated (RAN1, RAN2, RAN3)
Specify necessary UE RF and BS RF core requirements for new CP length (if defined) for eMBMS. (RAN4)

No new TDD DL/UL configuration for FS2 is considered in this WI

This work will consider the outcome of the corresponding SA2 work

In the following work with the eMBMS enhancements, the following clarifications concerning objectives b) and c) of the above WI Description, WID, were concluded:

Objectives b and c mean that legacy UEs cannot be scheduled on the carrier

A carrier that supports the use of more subframes for MBSFN (Multicast Broadcast Single Frequency Network), as well as completely excluding unicast regions in the MBSFN subframes, is being discussed in 3GPP. This new carrier is sometimes called a dedicated-MBMS carrier or an FeMBMS (Further enhanced MBMS) carrier. The dedicated-MBMS cell is defined in TS 36.300 Release 14 Section 15.2.1. In order to support idle mode FeMBMS operation on the carrier, the needed system information will need to be transmitted on the carrier. To increase the amount of resources that is used for MBSFN (MBMS) transfer, one of the objectives of the work item is to use all possible subframes as MBSFN subframes.

On an LTE carrier, which is not a dedicated-MBMS carrier, the MIB and the SIB1 message are scheduled periodically, where the MIB is transmitted in every radio frame (i.e. every 10 ms) with a periodicity of 40 ms, i.e. it will always have the same content during 40 ms. The SIB1 message is transmitted every 20 ms and has a periodicity of 80 ms. The MIB and the SIB1 are then transmitted in different subframes. As every subframe where system information is transmitted cannot be an MBSFN subframe, it has been proposed to transmit e.g. the MIB as well as needed system information messages in one and the same subframe, which is transmitted more seldom than the MIB and the SIB1 message that are transmitted on a legacy LTE carrier.

Further, on an LTE carrier, which is not a dedicated-MBMS carrier, only one system information message, such as either of e.g. the RRC messages System Information-BlockType1 (i.e. SIB1) or System Information, SI (carrying other SIBs), can be sent within one subframe. If the SIB1 message is transmitted in a subframe it is thus not possible to transmit other SIBs in the same subframe. The SIB1 message instead contains information of the scheduling of the System Information messages that contain the other SIBs. Several different System Information messages may then be scheduled, with different SIBs being included in the different messages. One or more SIBs may be included in the same System Information message. SIB1 is a message in itself whereas the other SIB types are Information Elements that are included in the System Information message.

The maximum size of a system information message is 277 bytes as stated in 3GPP TS 36.331. However, the content of a System InformationBlockType1, SIB1, message fits in a few tens of bytes. It is thus possible to combine SIB1 with other SIBs from size perspective. Thus, considering the sparseness of resources available on an FeMBMS carrier for SI broadcasting, the SIB1 message for the FeMBMS carrier should contain also other system information relevant for MBMS reception such as the content of SIB13 and possibly also relevant content from SIB2.

It is proposed in R2-166935 and R2-166936 to define a new message class and message structure for FeMBMS in TS36.331 similar to Single Cell Point To Multipoint, SC-PTM, as it is not very efficient to send only the SIB1 content in the SIB1 message. This new message can be called a new SIB1 or SI1 message. In addition, there are typically more SIBs that may need to be transmitted on the FeMBMS carrier, e.g. the SIB15 containing MBMS service continuity information, the SIB16 containing time information, and SIB10, SIB11 and SIB12 containing Earthquake and Tsunami Warning Service, ETWS, and Commercial Mobile Alert System, CMAS, warning information. These additional SIBs can be sent in another SI message scheduled by the first SIB1 message. FIG. 1 illustrates such a transmission scheme where different SI messages, here denoted SI1 and SIxy, are transmitted with successive MIBs. In this figure, "rep" indicates repetition and the MIBs are thus transmitted with a periodicity of 40 ms while each SI message SI1, SIxy is transmitted with a periodicity of 80 ms.

Different existing scheduling schemes will now be discussed.

In LTE, SIB1 schedulings are fixed which means that it is known in which subframe SIB1 is expected. Similarly, SIB1 "schedules" other SI messages which means that SIB1 indicates in which subframes a certain SI message can be expected. In these subframes, Downlink Control Information, DCI, is used to schedule the actual message. For example, DCI describes a Modulation and Coding Scheme, MCS, exact frequency allocation and the redundancy version index. In the context of MTC devices, it is possible to schedule a Bandwidth Restricted (BR) SIB1 or SIB1-BR for short, from MIB and other SI from SIB1-BR without use of DCI in any Physical Downlink Control Channel PDCCH or MTC physical downlink control channel MPDCCH, by fixing needed details by specification or in MIB/SIB1-BR respectively, see section 13 in R1-161546.

The RRC messages defined in 3GPP TS 36.331, including the SIB1 message, contain extensions where e.g. information related to newer 3GPP releases is included, so-called "release extensions". It is therefore a problem that a UE supporting a certain 3GPP release would typically not understand the parts of the message that are included as release extensions for a later release, when the UE receives such a message from the network. As an example, a Release 10 capable UE would understand some or all of the Release 8, Release 9 and Release 10 extensions of a SIB1 message but not the Release 11, Release 12 or Release 13 extensions. The amount of release extensions that the UE understands of the release it supports, or older releases, depends on e.g. what features are supported by the UE.

SUMMARY

It is an object of embodiments and examples described herein to address at least some of the problems and issues outlined above. It is possible to achieve this object and others by using a network node, a wireless device and methods therein, as defined in the attached independent claims.

According to one aspect, a method is performed by a network node for communicating system information to one or more wireless devices. In this method, the network node transmits a System Information Block Type1, SIB1, message that includes at least one other SIB than SIB1 as an extension. The network node also transmits the at least one other SIB in a subsequent separate System Information message if the one or more wireless devices include a wireless device that is not capable of reading the extension in the SIB1 message.

According to another aspect, a network node is arranged to communicate system information to one or more wireless devices. The network node is operable to transmit a System Information Block Type1, SIB1, message that includes at least one other SIB than SIB1 as an extension, and to transmit the at least one other SIB in a subsequent separate System Information message if the one or more wireless devices include a wireless device that is not capable of reading the extension in the SIB1 message. The above transmitting functionality may be realized by means of a transmitting unit in the network node.

According to another aspect, a method is performed by a wireless device for obtaining system information in a communication with a serving network node. In this method, the wireless device receives a System Information Block Type1, SIB1, message that includes at least one other SIB than SIB1 as an extension. The wireless device further reads the at least one other SIB in the received SIB1 if the wireless device is capable of reading the extension in the SIB1 message. Otherwise, the wireless device reads the at least one other SIB in a subsequently received separate System Information message if the wireless device is not capable of reading the extension in the SIB1 message.

According to another aspect, a wireless device is arranged to obtain system information in a communication with a serving network node. The wireless device is operable to receive a System Information Block Type1, SIB1, message that includes at least one other SIB than SIB1 as an extension, which functionality may be realized by means of a receiving unit in the wireless device. The wireless device is also operable to read the at least one other SIB in the received SIB1 if the wireless device is capable of reading the extension in the SIB1 message, or read the at least one other SIB in a subsequently received separate System Information message if the wireless device is not capable of reading the extension in the SIB1 message. The above reading functionality may be realized by means of a reading unit in the wireless device.

Advantages that may be achieved when implementing the above network node, wireless device and methods include that the distribution of system information can be optimized so that as much system information as possible, including the other SIB(s), can be included in the SIB1 message, which is transmitted frequently as compared to the System Information messages. Thereby, the wireless devices that are capable of reading the extension in the SIB1 message will acquire the system information earlier than if the other SIBs are only transmitted in less frequent System Information messages, while still enabling any wireless device(s) not capable of reading the extension in the SIB1 message to acquire the other SIB(s) from the subsequent System Information message. Further, the number of System Information messages that need to be scheduled can also be reduced. Since any amount of other SIB(s) can be included in the SIB1 message on a dynamic basis, the risk of exceeding the maximum message size for SIB1 can also be reduced.

The above network node, wireless device and methods may be configured and implemented according to different optional embodiments to accomplish further features and benefits, to be described below.

A computer program is also provided which comprises instructions which, when executed on at least one processor, cause the at least one processor to carry out either of the methods described above. A program carrier containing the above computer program is further provided, wherein the program carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Some problems associated with existing solutions will now be discussed.

A problem that has been recognized in the present solution is that if a new message is defined to include all necessary system information for eMBMS, this message may not be particularly flexible for different situations. Further, it may be useful to have a "future proof" solution, e.g. to avoid that the size of this new message becomes too large in case more information needs to be added to any of the included SIBs.

Figure 1:
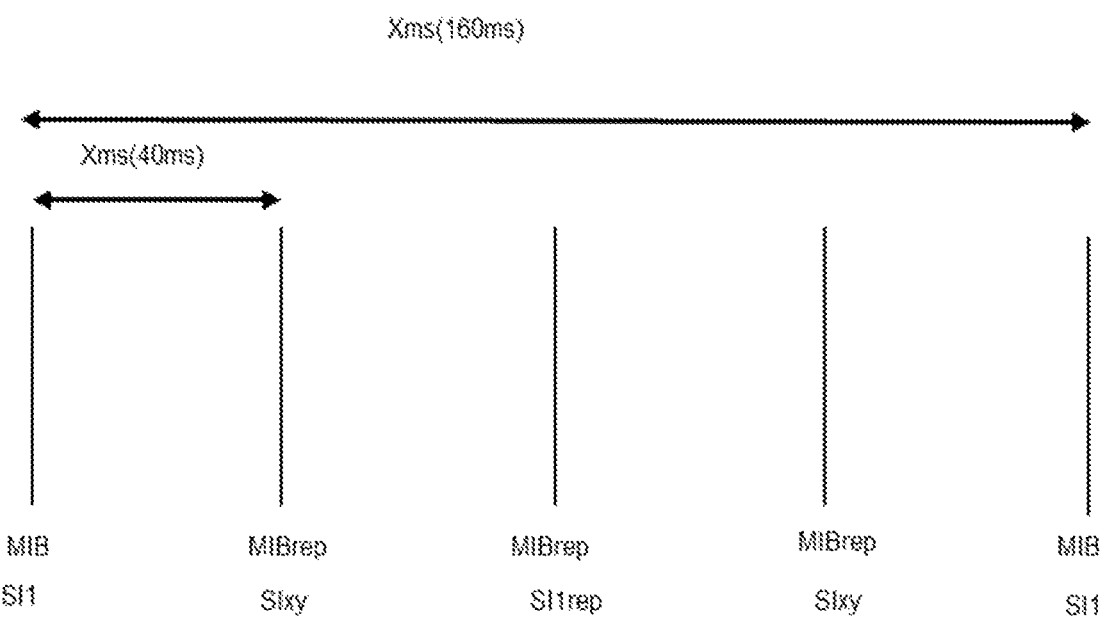
FIG. 1 is a diagram illustrating how SI messages can be scheduled in MIB messages, according to the prior art.

The situation illustrated in FIG. 1 occurs mainly when MBSFN subframe allocation is 100%. If MBSFN subframe allocation is less than 100%, e.g. 90% or 80%, a close to legacy SI (System Information) broadcasting is possible to apply. If the new message SI1 and the SIBs that it may schedule are defined flexibly, the same SI broadcasting scheme can be used efficiently in all cases. Further, it may be that this message is extended in other use cases for which the flexible design is also beneficial.

Another problem that might occur is related to the number of repetitions, also referred to as redundancy versions, of an SIB1 or SI message. Currently, the UE is expected to be scheduled with one system information message per subframe as the UE would need to know in advance which system information message is or can be scheduled in a specific subframe. As can be seen from FIG. 1, if the number of repetitions (or redundancy versions) for one SIB1 or SI message increases, the system information acquisition time increases as there can be only one SIB1 or SI message per subframe. For example, in legacy LTE, the SIB1 message is repeated four times in different subframes and another system information message, which may include several other SIBs, can be repeated several times depending on scheduling decision.

Thus, it may also be useful to be able to have multiple repetitions (or redundancy versions) of the same message in one subframe. In legacy LTE, the existing mechanism for distribution of system information means that a lot of space available for system information will not be used since the SIB1 message is transmitted every 20 ms with a lot of space available for additional system information. If that space could be used for transmission of other SIBs, the acquisition time for system information that a UE experiences could be decreased.

In the embodiments described herein, it is possible to include other SIB types than SIB1 as optional extensions in the System InformationBlock1 (SIB1) message on the FeMBMS carrier, and then allow the same SIB(s) to be included in a subsequent System Information, SI, message. The network may then transmit e.g. SIB2 and/or SIB13 within the SIB1 messages and/or transmit at least one of them separately. In the latter case, the SIB would then instead be scheduled within one of the System Information messages that are scheduled to be transmitted in other subframes.

It may also be possible to include other SIBs (i.e. SIB2 and higher, which today are distributed only through the System Information message) as optional extensions in the SIB1 message that is transmitted on an LTE carrier (in an LTE cell). The network may further include the SIB both as an optional extension in the SIB1 message and within one of the scheduled System Information messages. That way, newer UEs would be able to receive and acquire the SIB in question quicker since it is distributed as part of the SIB1 message as an extension which the newer UEs are capable of reading, which SIB1 message is scheduled with a high frequency. At the same time, a legacy UE (i.e. not supporting the optional inclusion of the SIB as an extension in the SIB1 message) would be able to receive the SIB within one of the System Information messages, just as in the legacy procedure. A legacy UE is also referred to as an "incapable device" herein meaning that the UE or device is not capable of reading any extension in the SIB1 message.

As an option, an SIB that is included as an optional extension in the SIB1 message may be different (e.g. optimized) than the corresponding legacy SIB. A UE that supports the inclusion of the other SIB as an extension in the SIB1 message would then however be able to skip the reading of the corresponding SIB in one of the scheduled System Information messages.

For enabling the above-mentioned multiple repetitions (or redundancy versions) of the same message in one subframe, a UE could be scheduled in the same subframe with more than one PDCCH with Cyclic Redundancy Check, CRC, scrambled with SI-RNTI with DCI format 1A or 1C. The UE should consider these to be PDSCH repetitions carrying the same SIB1 or SI message that the UE is expecting in this subframe. Redundancy version can be set to be the same or different among these versions. In general, SI-RNTI refers to "System Information—Radio Network Temporary Identifier" which is normally used to indicate where the SIBs are found on the Physical Downlink Shared Channel PDSCH, while the CRC is an error detecting code appended to a block of data in a transmitted message and the RNTI is used to scramble the CRC part of the message.

In an alternative example, the parallel PDSCH repetitions may not be scheduled using PDCCH but may be statically or semi-statically scheduled. In case of semi-static scheduling, the scheduling information can be carried e.g. in MIB or SIB1 similar to MTC work. The difference is that in this case, MIB/SIB1 would define multiple PDSCH repetitions (or redundancy versions) of the same message in parallel but separated in frequency and the UE is expected to combine these PDSCH repetitions. In MTC as well as in legacy procedures, SIB1-BR/SIB1 defines repetitions in consecutive subframes and repetitions can be added here within subframe parallel in frequency.

In yet another example, one DCI may schedule more than one SI message within the same PDSCH allocation. In this case, in addition to the total PDSCH allocation, there would be an indication of how many times an SI message is repeated there, parallel in frequency. For example, there can be a bit string representing 1,2,(3),4 which would inform the UE that there is e.g. 4 parallel repetitions of the same SI message. For example, DCI can point to 277 bytes, thus it fits well 4 times SIB1 that may have a size around 30 bytes.

The above-described way of including other SIB types than SIB1 as optional extensions in the System InformationBlock1 (SIB1) message to transmit system information from other SIBs than SIB1 within the SIB1 message, may result in the following advantages:
It is possible to increase the amount of information that is included in the SIB1 message on the FeMBMS carrier. This in turn leads to the following:
The number of subsequent System Information messages that need to be scheduled can be decreased;
The acquisition time for the system information on the FeMBMS carrier can be decreased for UEs;
Since the other SIBs can be dynamically included in the SIB1 message, the risk of exceeding the maximum message size (for SIB1) can be avoided.
The distribution of the system information can be made more efficient so that as much system information as possible (including one or more of the other SIBs, which today are transmitted within System Information messages) is included in the SIB1 message, which is transmitted frequently as compared to the less frequent System Information messages.
On an LTE carrier, the acquisition time for one or more of the other SIBs can be decreased for the UEs that support the added extension of SIB1, compared to using a conventional SIB1 message not having the extension. This can be done while still supporting system information distribution to legacy UEs which do not support the added extension of SIB1.

When enabling multiple repetitions (or redundancy versions) of the same message in one subframe in the manner described above, the following advantages may be achieved:
Redundancy versions of the same SIB1 or SI message can be transmitted to the UEs within a shorter time period as it would be possible to put repetitions into the same subframe.
The time that a UE needs for successful acquisition of the system information can be decreased.

The embodiments herein provide functionality in a network node to include SIB types other than SIB1, as optional extensions in the SIB1 message, as well as functionality in a wireless device to read and acquire the above information. This is possible to apply both for the SIB1 message that is used in LTE, the one that will be used on an FeMBMS carrier, which is specified as part of the 3GPP work item "eMBMS enhancements for LTE", and for other similar SIB1 messages, e.g. the one introduced for NB-Internet of Things, IoT.

For the FeMBMS carrier, where legacy UEs do not need to be supported, one or more of the Information Elements for the other System Information Block (SIB) types are then added as optional extensions to the SIB1 message. As an example, with optional extensions for SIB2 and SIB13 added, the network may dynamically include any of SIB2 and SIB13 in the SIB1 message or transmit them within separate scheduled System Information message(s).

The network may then dynamically construct the SIB1 message, and if needed schedule separate System Information messages, e.g. depending on the message size and the space available, and/or depending on what information that is considered most important for the different UEs to receive quickly.

For the LTE carrier, or any other carriers used by legacy UEs, it is also possible to introduce one or more of the Information Elements for the other System Information Block (SIB) types as optional extensions to the SIB1 message. In this case, the network may at the same time transmit those (legacy) SIBs within one of the scheduled System Information messages, as it is transmitted in the legacy procedure. Newer UEs would that way be able to receive the other SIB quicker since it is distributed as part of the SIB1 message, which is scheduled relatively frequently. At the same time, a legacy UE (i.e. not supporting the optional inclusion of the SIB in the SIB1 message) would be able to receive the same SIB within one of the System Information messages, just as in the legacy procedure. Such a legacy UE would also be able to successfully decode the SIB1 message which includes the other SIB since it is included as an extension to the message, which the UE is not required to decode. The legacy UE is thus capable of decoding the SIB1 message except for the extension.

In another example, the SIB that is included as an optional extension in the SIB1 message may be different than (e.g. optimized compared to) the corresponding legacy SIB. A UE that supports the inclusion of the SIB in the SIB1 message would then however be able to skip the reading of the corresponding SIB in one of the scheduled System Information messages. In another example, an indication such as a flag could then be included in the SIB1 message to inform the UE whether it needs to read a specific SIB which is being scheduled in one of the System Information messages or not. Such an indication or flag could be included within such a specific optional extension for a SIB (where the SIB may be different than the one that is sent within the System Information message).

For enabling multiple repetitions (or redundancy versions) of the same message in one subframe, a UE may be scheduled in the same subframe with more than one PDCCH with CRC scrambled with SI-RNTI with DCI format 1A or 1C. The UE should consider that these are PDSCH repetitions carrying the same SB1 or SI message that the UE is expecting in this subframe. Redundancy version can be set to be the same or different among these versions.

A UE that is expecting a certain SIB1 or SI message in a subframe may then, when receiving more than one instance of a PDCCH with CRC scrambled with SI-RNTI with e.g. DCI format 1A or 1C, consider these as redundancy versions of the expected SIB1 or SI message.

In another example, the SIB1 and SI messages may be scheduled so that the first instance of the PDCCH in the subframe with CRC scrambled with SI-RNTI is one specific SIB1 or SI message, and the one or several following instances may be other SIB1 and/or SI message(s), different from the first instance. The scheduling of these different messages may then as an example be indicated in the SIB1 message or in the MasterInformationBlock (MIB).

In an alternative example, the parallel PDSCH repetitions may not be scheduled using PDCCH but could be statically or semi-statically scheduled. In case of semi-static scheduling, the scheduling information can be carried e.g. in MIB or SIB1 similar to MTC procedures. A difference from the foregoing example is that in this case, MIB/SIB1 would define multiple PDSCH repetitions (or redundancy versions) of the same message in parallel in frequency and UE is expected to combine these. In MTC as well as in legacy SIB1-BR/SIB1 defines repetitions in consecutive subframes and repetitions can be added here within subframe parallel in frequency.

In yet another embodiment, one DCI schedules more than one SIB1 or SI message within the same PDSCH allocation. Here, in addition to the total PDSCH allocation, there would be an indication of how many times an SIB1 or SI message is repeated there, parallel in frequency. For example, there can be bit string representing 1, 2,(3), 4 which would indicate to the UE that there is e.g. 4 parallel repetitions of the same SI message. For example, DCI can point to 277bytes, thus it fits well 4 times a SIB1 message that may have size around 30bytes.

As an alternative, one or several of the additional SI messages that are scheduled with the DCI are not repetitions of the first message but instead other SI messages. As an example with 2 messages being scheduled with the same DCI, the first message could be a SIB1 message and the $2^{nd}$ message an SI message containing other SIBs. What different messages that are scheduled in the above-described way (using the SIB1 and SI messages) and that the UE thus may expect in a subframe may be indicated e.g. in the MIB or in a SIB1 message.

Another example of describing a solution to the above second issue may be enabling transmitting more than one repetition of the same system information message (which can be any system information message) within same subframe, (frequency multiplexed), and the UE will be able to combine these messages.

There may be several options for how this can be enabled. For example, PDCCH carriers more than one DCI CRC scrambled with same SI-RTNI, same DCI pointing to more than one SI message, MIB/SIB1 scheduling more than one SI message in one subframe. The UE may then be able to combine these messages.

Another example of describing a useful feature related to the embodiments herein may be:

A method performed by a network node for communicating system information to one or more wireless devices, the method comprising:

transmitting a System Information Block Type1, SIB1, message or a System Information message in a subframe, where the message is scheduled on the
PDCCH using the SI-RNTI, and
transmitting one or several additional System Information Block Type1, SIB1, message(s) or System Information message(s) in the same subframe, where the additional message(s) is/are also scheduled on the PDCCH using the same SI-RNTI.

Figure 2:
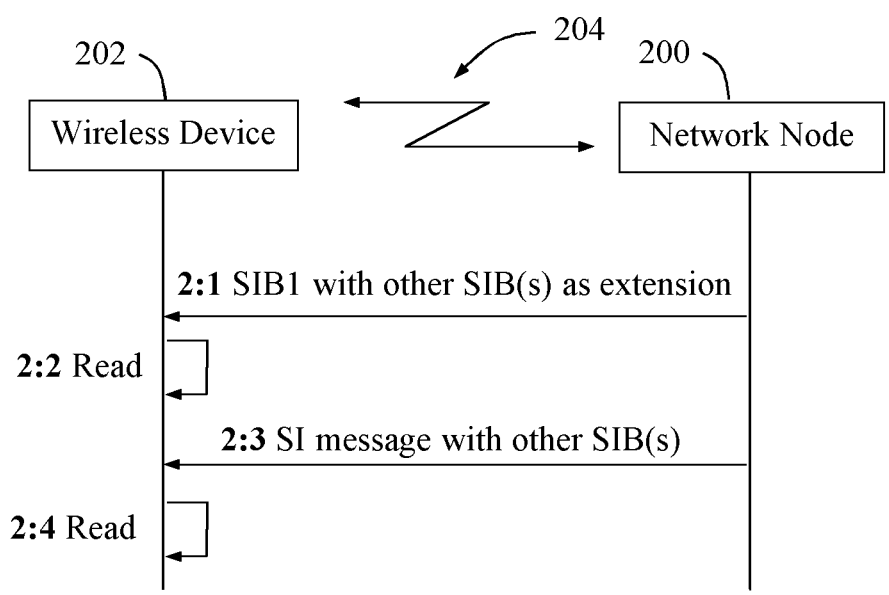
FIG. 2 is a signaling diagram illustrating an example of a procedure when the solution is used, according to some possible embodiments.

A communication scenario where at least some of the embodiments herein can be employed is illustrated in FIG. 2 involving a network node 200 of a wireless network and a wireless device 202 served by the network node 200, which communicate with each other over a wireless communication link 204. The wireless device 202 may alternatively be referred to as a UE. The network node 200 may be serving any number of other wireless devices as well according to the following procedure for transmitting system information from the network node 200 so that the system information can be obtained or acquired by the wireless device 202 and by other served wireless devices, not shown.

In a first shown action 2:1, the network node 200 transmits a System Information Block Type1, SIB1, message that includes at least one other SIB than SIB1 as an extension. A next action 2:2 illustrates that the wireless device 202 can read, i.e. acquire, the at least one other SIB in the SIB1, if the wireless device 202 is capable of reading such an extension in the SIB1 message. It was mentioned above that a legacy UE or device is typically not capable of reading extensions in the SIB1 message, and in that case action 2:2 would be omitted. The wireless device 202 may still read the SIB1 message in a regular manner but not the extension thereof.

The network node 200 may further transmit, in another action 2:3 , the at least one other SIB in a subsequent separate System Information message, if there is any served wireless device that is not capable of reading the extension in the SIB1 message. It may thus be assumed that the network node 200 has knowledge of whether the currently served wireless devices are capable of reading the extension in the SIB1 message or not. For example, a dedicated-MBMS carrier may be employed to achieve flexibility in bandwidth as follows. In a wide carrier, the SIB1 message can include also other SIB(s) as extension, but in a narrow carrier the other SIB(s) may need to be send separately on different subcarriers. If the SIB1 message includes e.g. SIB13 as an extension, that carrier can have more MBSFN subframes. If SIB13 needs to be sent separately, less subframes can be used for MBSFN.

In either case, when action 2:3 is performed, the wireless device 202 is able to read the at least one other SIB in the subsequently received System Information message, as shown in another action 2:4, if the wireless device 202 is not capable of reading the extension in the SIB1 message.

Thereby, if the wireless device 202 is capable of reading the extension in the SIB1 message it will acquire the system information in the other SIB(s) already in action 2:2 which is earlier than if the other SIB(s) would only be transmitted later in less frequent System Information messages. If the wireless device 202 is not capable of reading the extension in the SIB1 message, such as a legacy UE, it can still acquire the system information in the other SIB(s) from the subsequent System Information message as of action 2:4. Another advantage is that if there are no served wireless device that cannot read the extension in the SIB1 message, it is not necessary to transmit the other SIB(s) in any subsequent separate System Information message since there is no wireless device that needs to acquire this information from a separate System Information message, thereby saving radio resources.

Figure 3:
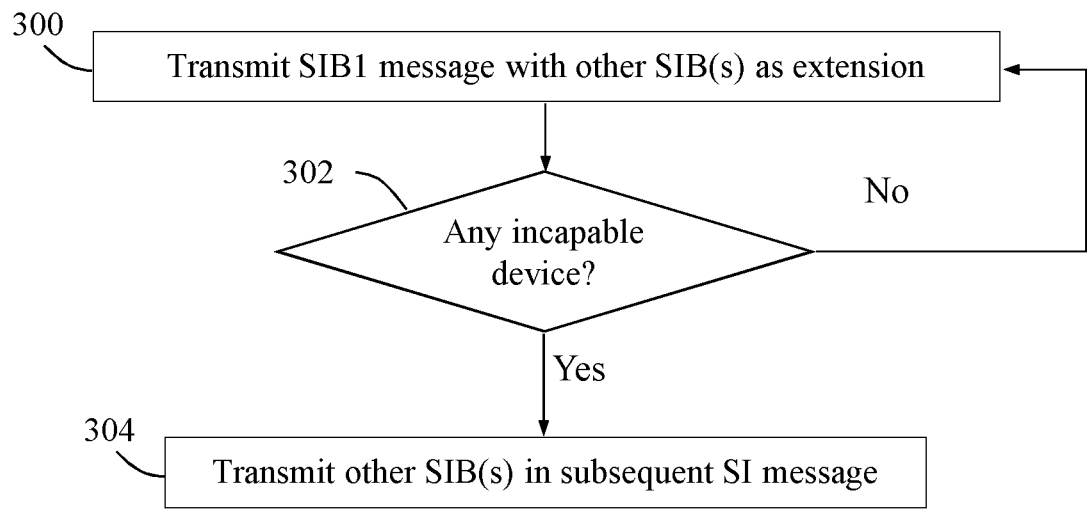
FIG. 3 is a flow chart illustrating a procedure in a network node, according to further possible embodiments.

A non-limiting example of how a network node may operate is illustrated by the flow chart in FIG. 3 which will now be described with further reference to FIG. 2. FIG. 3 thus illustrates a procedure in the network node such as network node 200 for communicating system information to one or more wireless devices such as the wireless device 200.

A first action 300 illustrates that the network node 200 transmits a System Information Block Type1, SIB1, message that includes at least one other SIB than SIB1 as an extension, as also shown in action 2:1 of FIG. 2. It may then be determined in an action 302 whether the one or more wireless devices include a wireless device that is not capable of reading the extension in the SIB1 message. In another action 304, if there are any incapable devices as determined in action 302, the network node 200 will further transmit the at least one other SIB in a subsequent separate System Information message, as also shown in action 2:3 of FIG. 2. Optionally, this action will thus be performed if the one or more wireless devices include a wireless device that is not capable of reading the extension in the SIB1 message.

Some optional and non-limiting embodiments of the above procedure in the network node will now be described. In one example embodiment, the at least one other SIB may be transmitted within the subsequent System Information message as a legacy SIB. The term "legacy SIB" indicates that the SIB is transmitted in a regular form which can be read by legacy UEs not supporting any of the newer 3GPP releases discussed above. Thereby, any legacy UE served by the network node 200 is able to read the at least one other SIB in the subsequent System Information message, even though the legacy UE is not capable of reading the extension in the SIB1 message.

In another example embodiment, the at least one other SIB that is included as an extension in the SIB1 message may be optimized compared to the legacy SIB. This means that the optimized SIB could contain the same information but using fewer bits as compared to the legacy SIB, thereby occupying less space in the SIB1 message, which may be achieved by applying some suitable type of compression on the information which a legacy UE or device may not be capable of decoding.

In another example embodiment, an indication such as a flag or the like may be included in the SIB1 message to inform wireless devices whether a specific SIB which is being scheduled in the System Information message needs to be read or not. This indication or flag may be a single bit such as 1 indicating that the wireless device needs to read the SIB or 0 indicating that the wireless device needs not read the SIB, or vice versa.

Figure 4:
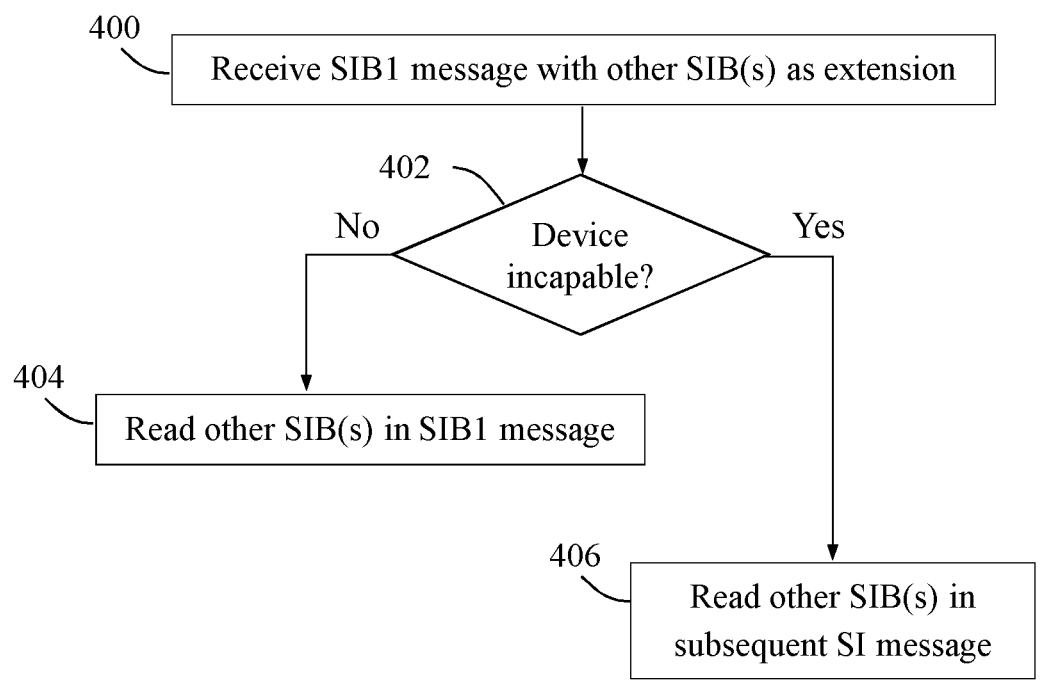
FIG. 4 is a flow chart illustrating a procedure in a wireless device, according to further possible embodiments.

In further example embodiments, said at least one other SIB may include at least one of SIB2 and SIB13, which has also been described above. However, the above procedure allows for including any one or more of the available other SIBs such as any of SIB2-SIB16, and the solution is not limited in this respect. Another non-limiting example of how a wireless device, such as the wireless device 202, may operate is further illustrated by the flow chart in FIG. 4 which will now be described likewise with further reference to FIG. 2. FIG. 4 thus illustrates a procedure in the wireless device 202 for obtaining system information in a communication with a serving network node such as the network node 200.

A first action 400 illustrates that the wireless device 202 receives a System Information Block Type1, SIB1, message that includes at least one other SIB than SIB1 as an extension, which corresponds to actions 2:1 and 300. If it is found in an action 402 that the wireless device 202 is capable of reading the extension in the SIB1 message, the wireless device 202 reads the at least one other SIB in the received SIB1 in a further action 404, as also shown in action 2:2 of FIG. 2. If the device 202 is incapable of reading any extension in the SIB1 message, the wireless device 202 instead reads the at least one other SIB in a subsequently received separate System Information message, in another action 406, as also shown in action 2:4 of FIG. 2. Hence, either of actions 404 and 406 will be performed depending on whether the wireless device 202 is capable of reading any extension in the SIB1 message or not.

Some optional and non-limiting embodiments of the above procedure in the wireless device will now be briefly outlined. The following embodiments correspond to the example embodiments described above for FIG. 3 and their features and advantages are therefore not necessary to repeat here. In one example embodiment, the at least one other SIB may be received by the wireless device within the subsequent System Information message as a legacy SIB. In another example embodiment, the at least one other SIB that is included as an extension in the SIB1 message may in that case be optimized compared to the legacy SIB.

In another example embodiment, an indication such as a flag is included in the SIB1 message to inform wireless devices whether a specific SIB which is being scheduled in the System Information message needs to be read or not. In another example embodiment, the at least one other SIB may, without limitation, include at least one of SIB2 and SIB13.

Figure 5:
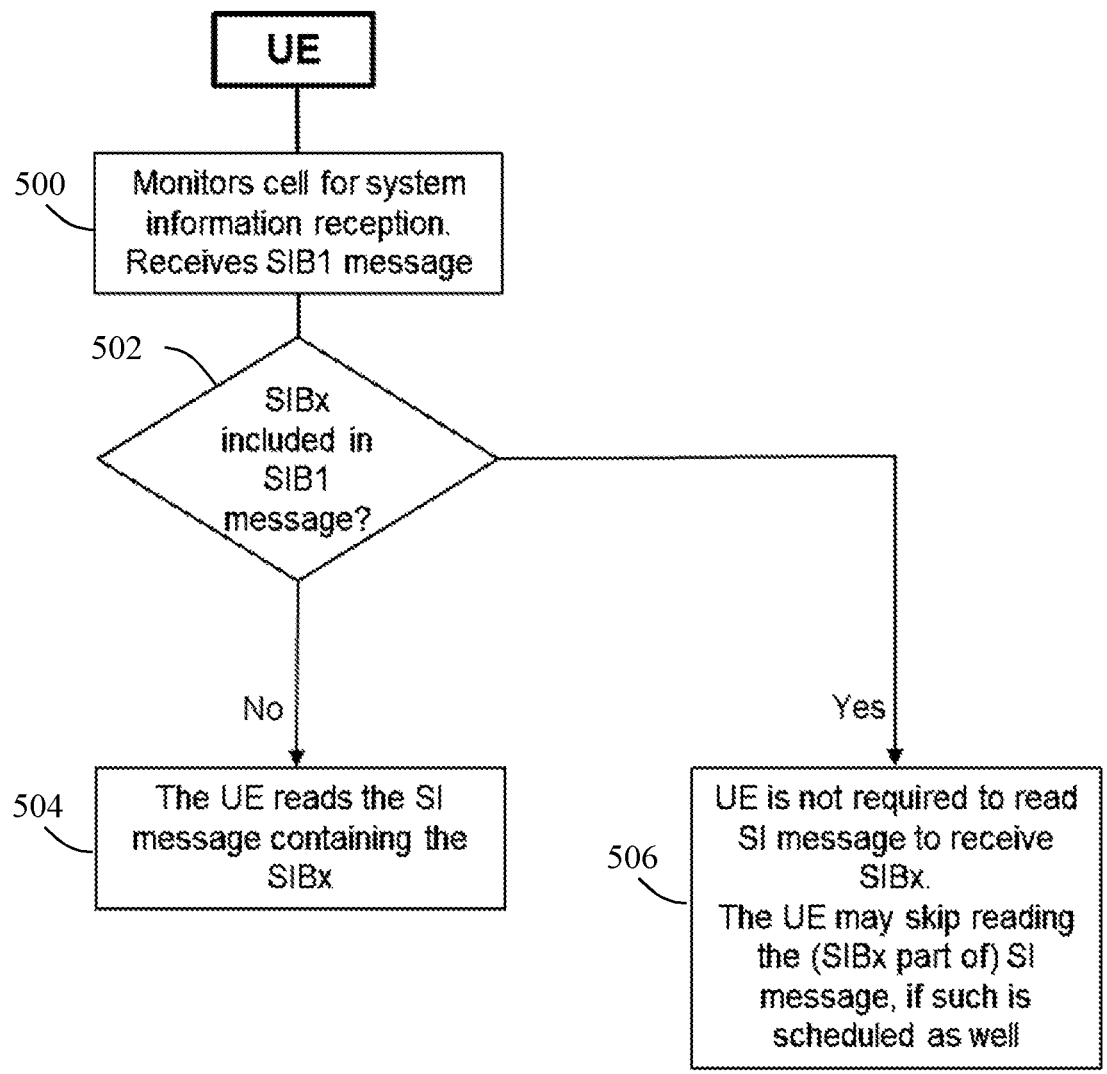
FIG. 5 is a flow chart illustrating another example of a procedure in a wireless device, according to further possible embodiments.

FIG. 5 illustrates another example of a procedure that may be performed by a wireless device or UE, such as the above wireless device 202, when some of the embodiments herein are used. In this example, it is assumed that the UE is not a legacy UE and it is thus capable of reading extensions in SIB1 messages.

Briefly described, a first action 500 illustrates that the UE receives a SIB1 message while monitoring a cell for system information reception, the cell being served by a network node such as the above network node 200. The UE then checks in an action 502 whether the received SIB1 message includes any other SIB as an extension, here denoted SIBx. If not, the UE will read a subsequent System Information message in an action 504.

On the other hand, if the received SIB1 message did include SIBx as an extension, the UE is not required to read a subsequent System Information message in order to receive and acquire SIBx, as indicated by an action 506. The UE may therefore skip reading the subsequent System Information message, or at least the part than includes SIBx if scheduled therein.

Figure 6:
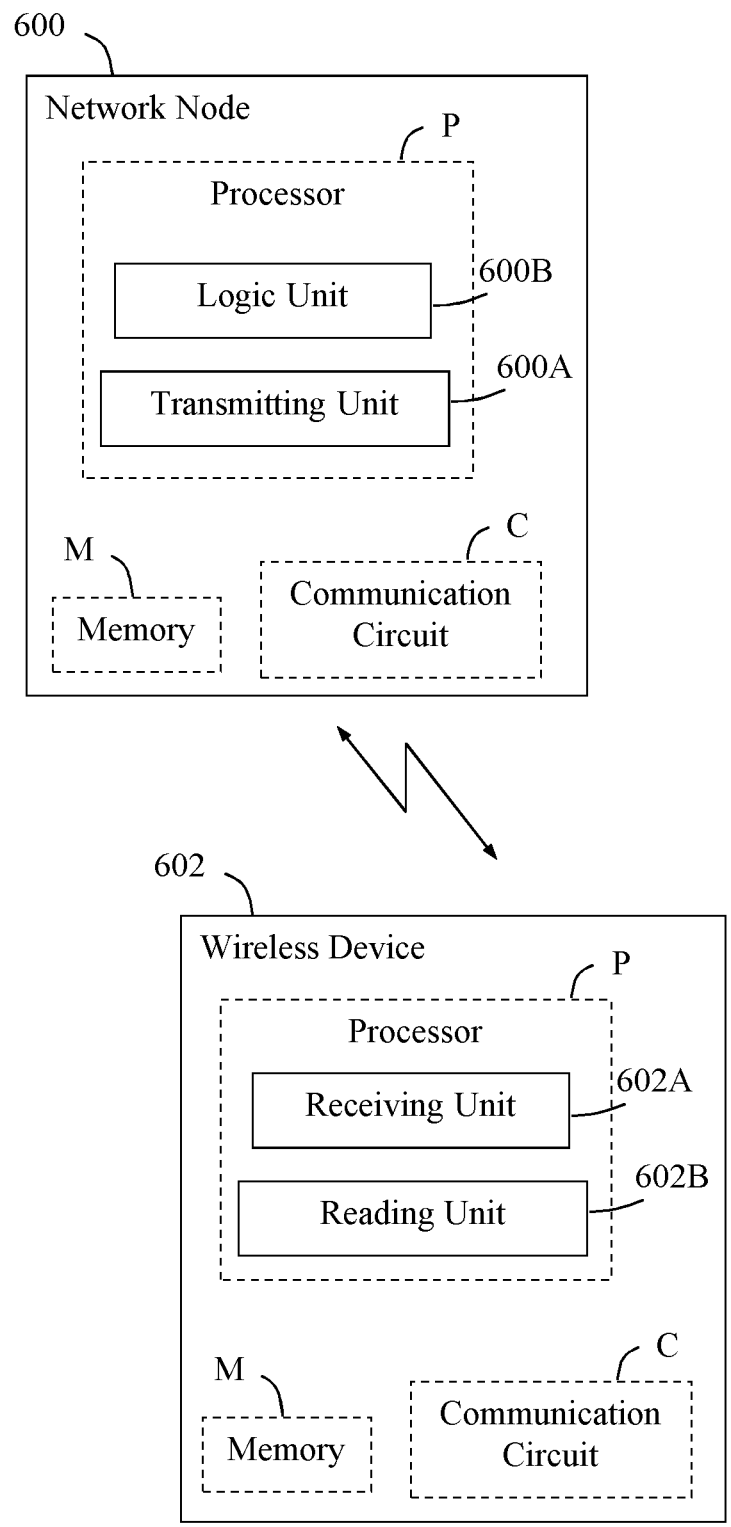
FIG. 6 is a block diagram illustrating a network node and a wireless device in more detail, according to further possible embodiments.

The block diagram in FIG. 6 illustrates a detailed but non-limiting example of how a network node 600 and a wireless device 602, respectively, may be structured to bring about the above-described solution and embodiments thereof. In this figure, the network node 600 and the wireless device 602 may be configured to operate according to any of the examples and embodiments of employing the solution as described herein, where appropriate. Particularly in the manner described above for FIGS. 3 and 4, respectively. Each of the network node 600 and the wireless device 602 is shown to comprise a processor "P", a memory "M" and a communication circuit "C" with suitable equipment for transmitting and receiving radio signals in the manner described herein.

The communication circuit C in each of the network node 600 and the wireless device 602 thus comprises equipment configured for communication with each other using a suitable protocol for the communication depending on the implementation. The solution is however not limited to any specific types of radio signals or protocols.

The network node 600 is, e.g. by means of units, modules or the like, configured or arranged to perform at least some of the actions of the flow chart in FIG. 3 as follows. Further, the wireless device 602 is, e.g. by means of units, modules or the like, configured or arranged to perform at least some of the actions of the flow chart in FIG. 4 as follows.

The network node 600 is arranged to communicate system information to one or more wireless devices 602. The network node 600 is operable to transmit a System Information Block Type1, SIB1, message that includes at least one other SIB than SIB1 as an extension. This operation may be performed by a transmitting unit 600A in the network node 600, as illustrated in action 300. The network node 600 may also be operable to transmit the at least one other SIB in a subsequent separate System Information message, e.g. if the one or more wireless devices include a wireless device that is not capable of reading the extension in the SIB1 message. This operation may be performed by the transmitting unit 600A, as illustrated in action 304.

The network node 600 may further comprise a logic unit 600B operable to perform various logical operations in the manner described herein, e.g. for FIG. 3, such as determining how the SIB1 message and the subsequent System Information message should be formed. These logical operations may thus include deciding to transmit the other SIB(s) within the subsequent System Information message as a legacy SIB, optimizing the at least one other SIB for inclusion as an extension in the SIB1 message, deciding to include the above-described flag in the SIB1 message, and deciding to include SIB2 and/or SIB13 in the other SIB(s).

The wireless device 602 is arranged to obtain system information in a communication with a serving network node 600. The wireless device 602 is operable to receive a System Information Block Type1, SIB1, message that includes at least one other SIB than SIB1 as an extension. This operation may be performed by a receiving unit 602A in the wireless device 602 as illustrated in action 402.

The wireless device 602 is also operable to read the at least one other SIB in the received SIB1 if the wireless device 602 is capable of reading the extension in the SIB1 message. This operation may be performed by a reading unit 602B in the wireless device 602, as illustrated in action 404. The wireless device 602 may also be operable to read the at least one other SIB in a subsequently received separate System Information message if the wireless device 602 is not capable of reading the extension in the SIB1 message. This operation may be performed by the reading unit 602B, as illustrated in action 406.

It should be noted that FIG. 6 illustrates various functional modules in the network node 600 and the wireless device 602, respectively, and the skilled person is able to implement these functional modules in practice using suitable software and hardware equipment. Thus, the solution is generally not limited to the shown structures of the network node 600 and the wireless device 602, and the functional units therein may be configured to operate according to any of the features, examples and embodiments described in this disclosure, where appropriate.

The functional modules 600A-C and 602A-C described above may be implemented in the network node 600 and the wireless device 602, respectively, by means of program modules of a respective computer program comprising code means which, when run by the processor P causes the network node 600 and the wireless device 602 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network 600 and the wireless device 602 in the form of a memory having a computer readable medium and being connected to the processor P. The computer program product or memory M in each of the network node 600 and the wireless device 602 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 600 and wireless device 602.

The solution described herein may be implemented in each of the network node 600 and the wireless device 602 by a computer program comprising instructions which, when executed on at least one processor, cause the at least one processor to carry out the actions according to any of the above embodiments and examples, where appropriate. The solution may also be implemented at each of the network node 600 and the wireless device 602 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "system information", "System Information Block, SIB", "SIB1 message", "SIB1 message", "System Information message", "legacy SIB" and "flag" have been used throughout this disclosure, although any other corresponding entities, functions, and/or parameters could also be used having the features and characteristics described here. The solution may be implemented according to the appended claims.

The invention claimed is:

1. A method performed by a network node for communicating system information to one or more wireless devices the method comprising:
   transmitting a System Information Block Type1, SIB1, message that includes at least one other SIB than SIB1 as an extension, and
   transmitting the at least one other SIB in a subsequent separate System Information message if the one or more wireless devices include a wireless device that is not capable of reading the extension in the SIB1 message.

2. A method according to claim 1, wherein the at least one other SIB is transmitted within the subsequent System Information message as a legacy SIB.

3. A method according to claim 2, wherein the at least one other SIB that is included as an extension in the SIB1 message is optimized compared to the legacy SIB.

4. A method according to claim 1, wherein a flag is included in the SIB1 message to inform wireless devices whether a specific SIB which is being scheduled in the System Information message needs to be read or not.

5. A method according to claim 1, wherein said at least one other SIB includes at least one of SIB2 and SIB13.

6. A network node arranged to communicate system information to one or more wireless devices, wherein the network node is operable to:
   transmit a System Information Block Type1, S1B1, message that includes at least one other SIB than SIB1 as an extension, and
   transmit the at least one other SIB in a subsequent separate System Information message if the one or more wireless devices include a wireless device that is not capable of reading the extension in the SIB1 message.

7. A network node according to claim 6, wherein the at least one other SIB is transmitted within the subsequent System Information message as a legacy SIB.

8. A network node according to claim 7, wherein the at least one other SIB that is included as an extension in the SIB1 message is optimized compared to the legacy SIB.

9. A network node according to claim 6, wherein a flag is included in the SIB1 message to inform wireless devices whether a specific SIB which is being scheduled in the System Information message needs to be read or not.

10. A network node according to claim 6, wherein said at least one other SIB includes at least one of SIB2 and SIB13.

11. A method performed by a wireless device for obtaining system Information in a communication with a serving network node, the method comprising:
    receiving a System Information Block Type1, SIB1, message that includes at least one other SIB than SIB1 as an extension, and
    reading the at least one other SIB in the received SIB1 if the wireless device is capable of reading the extension in the SIB1 message, or
    reading the at least one other SIB in a subsequently received separate System Information message if the wireless device is not capable of reading the extension in the SIB1 message.

12. A wireless device arranged to obtain system information in a communication with a serving network node, wherein the wireless device is operable to:
    receive a System Information Block Type1, SIB1, message that includes at least one other SIB than SIB1 as an extension, and
    read the at least one other SIB in the received SIB1 if the wireless device is capable of reading the extension in the SIB1 message, or
    read the at least one other SIB in a subsequently received separate System Information message if the wireless device is not capable of reading the extension in the SIB1 message.

13. A wireless device according to claim 12, wherein the at least one other SIB is received within the subsequent System Information message as a legacy SIB.

14. A wireless device according to claim 13, wherein the at least one other SIB that is included as an extension in the SIB1 message is optimized compared to the legacy SIB.

15. A wireless device according to claim 12, wherein a flag is included in the SIB1 message to inform wireless devices whether a specific SIB which is being scheduled in the System Information message needs to be read or not.

16. A wireless device according to claim 12, wherein said at least one other SIB includes at least one of S1B2 and SIB13.

17. A network node arranged to communicate system information to one or more wireless devices, the network node comprising a processor (P) and a memory (M) containing instructions executable by the processor whereby the network node is operable to:
    transmit a System Information Block Type1, S1B1, message that includes at least one other SIB than SIB1 as an extension, and
    transmit the at least one other SIB in a subsequent separate System Information message if the one or more wireless devices include a wireless device that is not capable of reading the extension in the SIB1 message.

18. A network node according to claim 17, wherein the at least one other SIB is transmitted within the subsequent System Information message as a legacy SIB.

19. A network node according to claim 18, wherein the at least one other SIB that is included as an extension in the SIB1 message is optimized compared to the legacy SIB.

20. A network node according to claim 17, wherein a flag is included in the SIB1 message to inform wireless devices whether a specific SIB which is being scheduled in the System Information message needs to be read or not.

21. A network node according to claim 17, wherein said at least one other SIB includes at least one of SIB2 and SIB13.

22. A wireless device arranged to obtain system information in a communication with a serving network node, the wireless device comprising a processor (P) and a memory (M) containing instructions executable by the processor whereby the wireless device is operable to:

receive a System Information Block Type1, SIB1, message that includes at least one other SIB than SIB1 as an extension, and read the at least one other SIB in the received SIB1 if the wireless device is capable of reading the extension in the SIB1 message, or read the at least one other SIB in a subsequently received separate System Information message if the wireless device is not capable of reading the extension in the SIB1 message.

23. A wireless device according to claim 22, wherein the at least one other SIB is received within the subsequent System Information message as a legacy SIB.

24. A wireless device according to claim 23, wherein the at least one other SIB that is included as an extension in the SIB1 message is optimized compared to the legacy SIB.

25. A wireless device according to claim 22, wherein a flag is included in the SIB1 message to inform wireless devices whether a specific SIB which is being scheduled in the System Information message needs to be read or not.

26. A wireless device according to claim 22, wherein said at least one other SIB includes at least one of SIB2 and SIB13.

\* \* \* \* \*